J. GRAINGER & W. H. STROHM.
MOTOR VEHICLE JACK.
APPLICATION FILED SEPT. 11, 1917.
1,270,407.
Patented June 25, 1918.
2 SHEETS—SHEET 1.
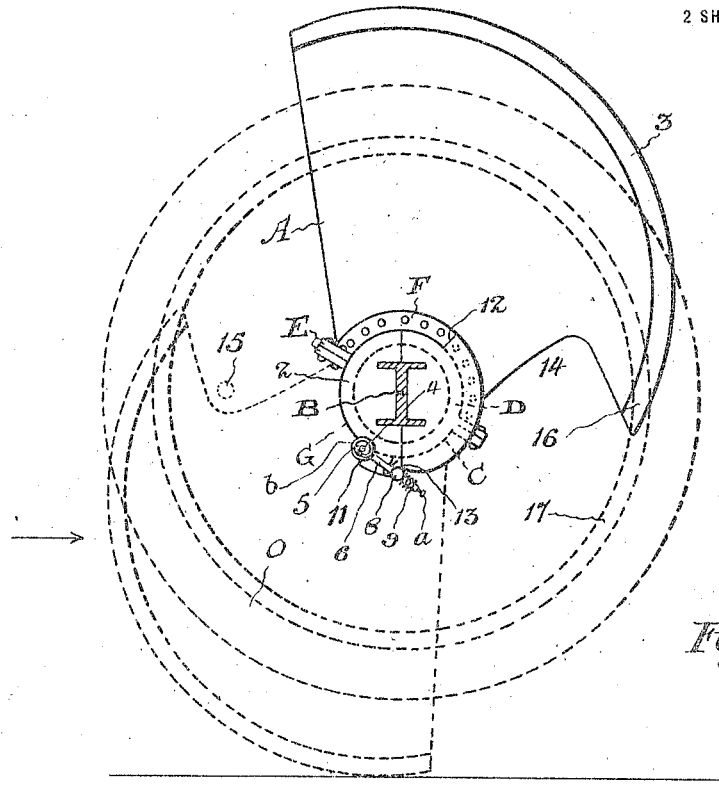
Fig. 1.
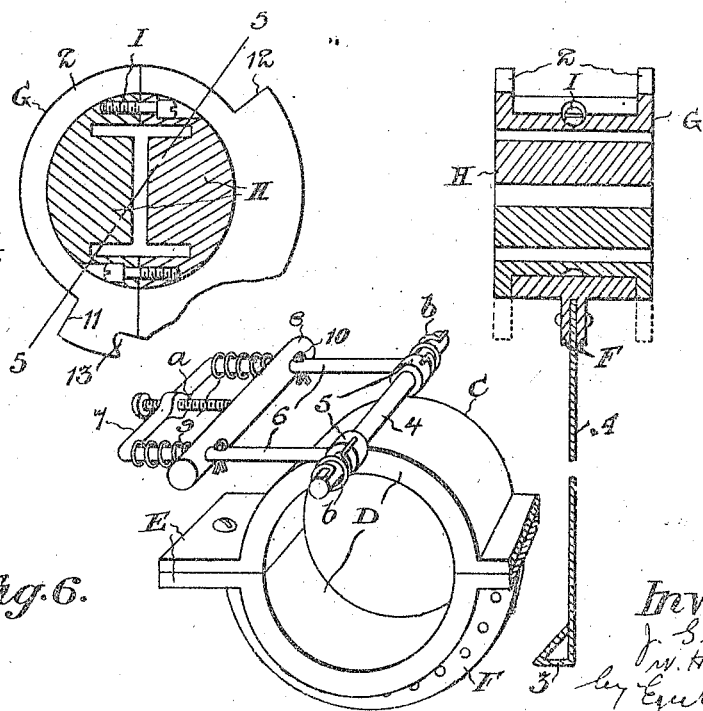
Fig. 4.   Fig. 5.
Fig. 6.
Inventors.
J. Grainger,
W. H. Strohm,
by Egerton R. Case
Atty.

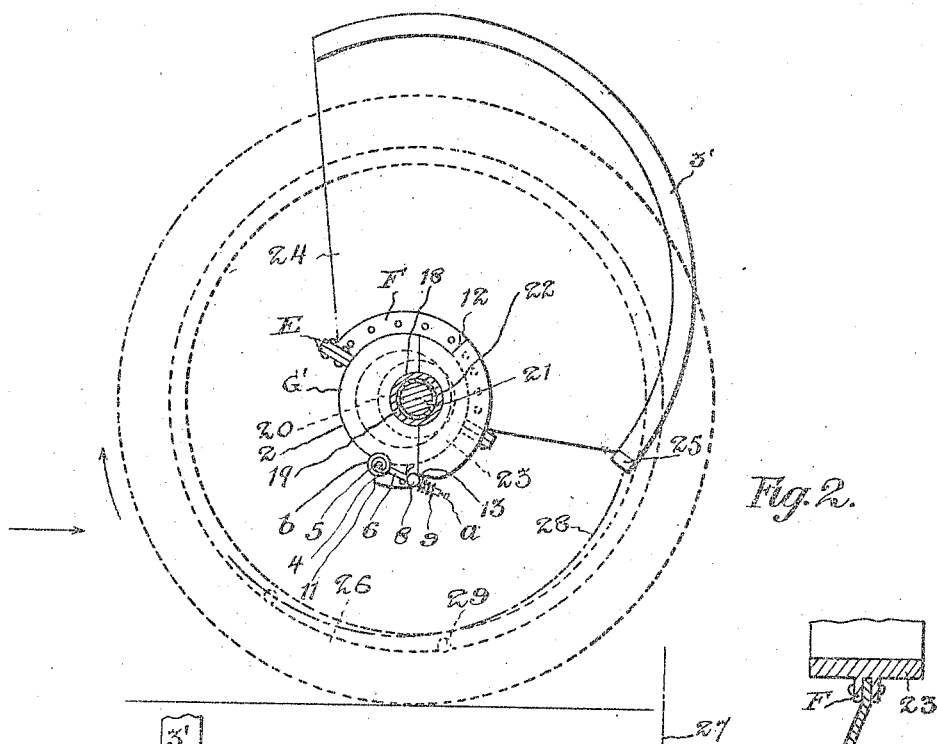
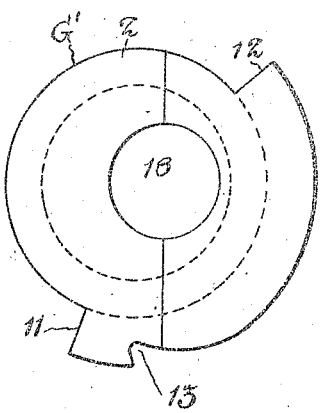
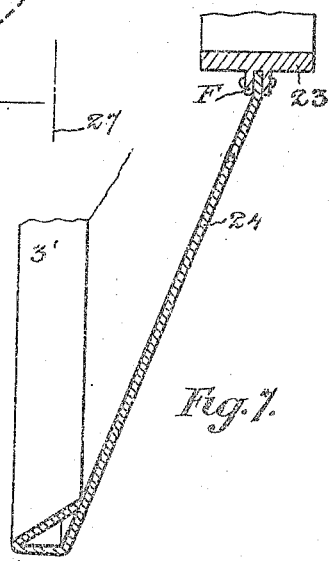

UNITED STATES PATENT OFFICE.

JOSEPH GRAINGER AND WILLIAM HENRY STROHM, OF TORONTO, ONTARIO, CANADA.

MOTOR-VEHICLE JACK.

1,270,407.   Specification of Letters Patent.   Patented June 25, 1918.

Application filed September 11, 1917. Serial No. 190,758.

*To all whom it may concern:*

Be it known that we, JOSEPH GRAINGER and WILLIAM HENRY STROHM, respectively a subject of the King of Great Britain and a citizen of the United States of America, both of the city of Toronto, county of York, Province of Ontario, Canada, have invented certain new and useful Improvements in Motor-Vehicle Jacks, of which the following is a specification.

Our invention relates to improvements in motor-vehicle jacks, and the object of our invention is to mount in convenient position on a motor-car, preferably on the front and rear axles, jacks which will permit the car to be jacked up using the motor itself to develop the necessary power for this purpose. Various other objects of our invention will appear in the following specification.

In the following specification, we shall describe a jack within our invention, and convenient means for mounting the same in place, and suitable locking means therefor to hold the jack securely in place when not in use.

Figures 1 and 2 are side elevations of jacks within our invention adapted respectively for use on front and rear axles, certain supporting parts being shown in section and the wheels dotted; Fig. 3 is a side elevation of a bearing member for the hub of the rear jack; Fig. 4 is a vertical cross section through a bearing member for the hub of the front jack; Fig. 5 is a section on the line 5—5, Fig. 4, showing part of a jack and hub; Fig. 6 is a perspective view of a suitable hub for the jack, and locking means carried thereby; Fig. 7 is a sectional detail, partly in perspective, of a portion of a rear jack and part of a hub therefor, and Fig. 8 is a detail view, in side elevation, of part of a rear jack showing contact stud carried thereby.

In the drawings, like characters of reference refer to the same parts.

It is now common to utilize any of the well-known types of jacks to jack up a car, and in order to do this, particularly if the car be a heavy one, an appreciable amount of time and energy is involved. The source of such energy is manual, and we propose by means of our invention, to utilize the power developed by the motor of the vehicle itself to effect the object in view.

Except in respect of certain details of construction hereinafter referred to, the said jacks are substantially the same. The jack A for the front axle B is provided with any suitable type of hub C, which in our preferred form of construction is formed of two halves D provided in the usual manner with flanges E suitably secured together. One way of securing the jack to the hub C is by securely mounting the same between flanges F carried by one of the members of the said hub. G is a suitable bearing-member, preferably made of two members H shaped substantially to fit the axle B. The members H are secured together by any suitable means such as screws I, of a well-known form of construction. Constructing the bearing-member G as described, permits us to apply our jacks to cars already manufactured. As shown in Fig. 1, the hub C is journaled on the members H and operates between the flanges 2 with which said members are provided.

The tread or periphery 3 of the jack A is eccentric in respect of the axis of the wheel O so as to secure the necessary lifting movement. To place the jack in operation, the locking means employed to hold it out of use, is unlocked, thereby permitting the jack to be moved into contact with the roadway. By moving the car forward under its own motive power, the jack will in due course raise up the desired wheel off the ground. When the wheel is raised up the desired height, means come in contact with the bearing-member G to stop further movement of the jack. 4 is a bar secured to or formed a part of the hub C. This bar projects beyond each side of the hub, and mounted thereon, adjacent each side of the said hub, are sleeves 5. Carried by each of these sleeves is a frame composed of side bars 6 tied together by a bar 7. Mounted to have movement on the bars 6 is a bar 8 between which and the bar 7, are coiled springs 9, mounted on the bar 6, which keep this bar under pressure against the stops 10 carried by the bar 6. Certain portions of the flanges 2 project to form shoulders 11 and 12. In the normal position of the jack, the bar 4 rests in contact with the shoulders 11, and the bar 8 rests in the notches 13, (one only of which is shown), formed in the flanges 2. To permit the jack to drop, the bar 8 is thrown out of the notches 13, and then the locking mechanism just described, rotates with the hub C until finally the bar 4 comes into contact with the shoulders 12 to limit the movement of the jack, as before described.

To lower the wheel into contact with the ground, it is only necessary to back the car up, and then the jack is locked in normal position, as will be understood.

The jack as used on the front axle B, will be formed with a reëntrant angle 14, to avoid conflict with the bar 15 of the steering gear. A portion 16 of the tread 3 will preferably occupy a position nearer the axle than the felly 17 of the wheel so as to permit the wheel to be jacked up with or without the tire on.

The preferred form of jack permits the car to be jacked up and lowered into contact with the roadway without any jarring.

To associate the jack with the rear drive axle, in the preferred manner, we prefer to make the bearing-member G' of two members, and secure them together after any suitable manner. The bearing-member G' is substantially identical in construction to the bearing-member G, only that it is provided that an eccentric bore 18 by means of which the bearing-member is clamped tightly around the hub 19 of the brake-drum indicated by the dotted circle 20. 21 is the drive-axle and 22 the tubular housing therefor. The hub 23 of the jack 24 is made to have bearing on the bearing-member G'. Secured to or formed a part of the jack 24 is a stud 25, and in order to position this stud in convenient relationship in respect of the drive-wheel 26, the jack is dished as shown clearly in Fig. 7, to position the tread or periphery 3' thereof beyond the outer end of the brake-drum 20 indicated by the broken line 27, Fig. 7. To jack up the rear wheel, when the jack 24 is unlocked, and since the jack has an eccentric movement in respect of the drive-wheel 26, the stud 25 follows substantially the path indicated by the broken line 28, which will bring it into the path of movement of one or more studs 29, carried by the felly. In Fig. 2, the wheel is presumed to be positioned between the spectator and the jack, and therefore it will be understood that as the wheel rotates, one of the studs 29 will come in contact with the stud 25 and so move the jack to effect the purpose in view. By means of the differential gear, (not shown) controlling the drive-axle 21, so soon as the jack 24 is stopped from further movement, the said wheel will cease movement.

The eccentric pivotal movement given the jack 24, will position the stud 25 clear of the path of movement of the stud 29 when the said jack occupies normal position.

It is important that the jacks be firmly locked in place against accidental displacement: Any suitable means for this purpose may be employed, and a convenient means consists of a screw a, threaded through the bar 7 and exerting pressure against the bar 8 to lock it in the notches 13. By retracting the screw a, sufficiently, the bar 8 will be allowed sufficient movement to permit the jack to be unlocked.

While we have described what we consider to be the best embodiments of our invention, it will be understood that the principle may be embodied in different forms, and we desire not to be limited beyond the requirements of the prior art and the terms of our claims.

In order to keep the bar 8 in contact with the flanges 2 of the bearing-member G to prevent rattling, and also to assist in keeping the bar 8 in the notches 13, coiled springs b are mounted on the ends of the bar 4, one end of the springs being secured to said bar, and the other end secured to the sleeves 5.

What we claim as our invention is:

1. In a motor-vehicle, the combination with a support forming part thereof, and a wheel carried thereby provided with one or more studs, of a bearing member eccentrically mounted from said support, a jack eccentrically mounted on said bearing-member, provided with a lug which, when the jack is moved downwardly, will be brought into the path of movement of the studs carried by said wheel, one of which will contact therewith during the rotation of said wheel and so move the jack around its axis to jack up the wheel.

2. In a motor-vehicle, the combination with an axle thereof; and a wheel carried thereby provided with one or more studs; of a bearing member eccentrically mounted on said axle; a jack provided with a tread eccentric to the axis of said wheel and journaled on said bearing member and further provided with a lug which, when the jack is moved downwardly, will be brought into the path of movement of the studs carried by said wheel one of which will contact therewith during the rotation of said wheel and so move the jack around its axis to jack up the wheel.

3. In a motor-vehicle, the combination with an axle thereof, and a wheel carried thereby provided with one or more studs; of a bearing member eccentrically mounted on said axle and provided with radially disposed flanges spaced apart which are formed to provide shoulders; a jack provided with a tread eccentric to the axis of said wheel and journaled on said bearing member between the flanges thereof, and further provided with a lug which, when the jack is moved downwardly, will be brought into the path of movement of the studs carried by the said wheel, one of which will contact therewith during the rotation of said wheel and so move the jack around its axis to jack up the wheel, and means carried by said jack whereby the movement thereof is limited by contact with said shoulders, and whereby the jack is locked in normal position.

4. In a motor-vehicle, the combination with the axle thereof, and a wheel carried thereby provided with one or more studs; of a bearing member eccentrically mounted on said axle and provided with radially disposed flanges spaced apart which are formed to provide two pairs of shoulders; a jack provided with a tread eccentric to the axis of said wheel and journaled on said bearing member between the flanges thereof, and further provided with a lug which, when the jack is moved downwardly, will be brought into the path of movement of the studs carried by said wheel, for the purpose specified; a bar carried by said jack and normally resting in contact with one pair of said shoulders; a frame movably mounted on said bar and designed to be positioned beyond each side of said bearing member; another bar movably mounted on said frame designed to perform the function of a bolt to rest in the notch formed in said flanges; springs carried by said frame to keep said bolt in said notches, and a screw carried by said frame and designed to lock said bolt in place; said bar designed to be brought into contact with the other pair of said shoulders of said bearing member to limit the downward movement of said jack.

JOSEPH GRAINGER.
WILLIAM HENRY STROHM.